US005356697A

United States Patent [19]

Jonas

[11] Patent Number: 5,356,697
[45] Date of Patent: Oct. 18, 1994

[54] SYNTHETIC WOOD-SIGN SUBSTITUTE

[76] Inventor: William P. Jonas, 102 Tenth Ave., Apt. 4, Belmar, N.J. 07719

[21] Appl. No.: 116,847

[22] Filed: Sep. 7, 1993

[51] Int. Cl.[5] .......... B32B 5/18

[52] U.S. Cl. .......... 428/195; 428/218; 428/316.6; 428/318.4

[58] Field of Search .......... 428/77, 151, 195, 218, 428/316.6, 318.4

[56] References Cited

U.S. PATENT DOCUMENTS 5,227,230 7/1993 McGlade .......... 428/316.6

*Primary Examiner*—Alexander S. Thomas
*Attorney, Agent, or Firm*—Charles I. Brodsky

[57] ABSTRACT

A synthetic wood-sign substitute capable of being sandblasted and fabricated with less labor involvement incorporating a substrate composed of a plurality of overlying foam laminations of a first density spaced apart one from another by a plurality of separators of greater density, with the separators being of a narrower width then the overlying foam laminations, with the foam laminations being colored throughout, and with the substrate forming a panel for a sign.

11 Claims, 1 Drawing Sheet

SYNTHETIC WOOD-SIGN SUBSTITUTE

FIELD OF THE INVENTION

This invention relates to the "sign industry" and, more particularly, to the three-dimensional signs capable of withstanding outdoor weather conditions for periods of 5–10 years, and longer.

BACKGROUND OF THE INVENTION

As is well known and understood, as the demand for housing increases, the housing industry responds by building additional residential developments. As is also well known, as these developments are constructed, the "sign industry" is called upon to create long-term signage—not only at the entrance to the development, but throughout its streets. Such signage is selected by the developers, generally to convey a distinctive feeling about the community under construction, especially to prospective purchasers.

As will be appreciated by those skilled in the "sign industry", most developers prefer three-dimensional letters on these signs, for several reasons: a) because a simple, flat-painted sign tends to fade out over the years; and b) the elegance of three-dimensional signage adds the appearance of higher value and a sense of permanence to the community. As a result, the letters on these signs were originally either hand-carved, or cut out by hand and applied to an appropriate background.

Recently, however—and to keep up with a growing demand—, a further technique was developed to create such three-dimensional signage, using less materials and taking less time in the manufacture. According to such technique—"sandblasting"—, a rubber masking material is laid out where the lettering will be placed on a wooden sign blank, with the background then eroded away with a high-pressure sandblast unit, typically employing a 10 hp compressor. The end result was a smooth, flat letter raised out of a high-relief, woodgrain-patterned background.

As is additionally well known, such an arrangement produces not only a three-dimensional sign, but one in which the exposed woodgrain adds a natural element to the sign, that is missing in the more sterile-looking flat signage of previous use. In particular, the "sandblasted" wood process produced such a rich-looking sign that the technique quickly spread from the housing developments to store-front signs, and to all types of custom signage and decorating, especially once "sandblasted" redwood signs began to gain popularity. Unfortunately, even though "redwood" is the preferred lumber for these sign constructions (because it is generally impervious to insects and weathers exceptionally well and provides a rich appearance), only a small percentage of the wood from a cut redwood tree is suitable for the sign industry.

In particular, the redwood which is usable must be free of knots, come from the inner part of the tree, and must possess a vertical grain when viewed from the end of the board laying flat in order for the sandblasting force to blast-away the soft wood between the harder grain. Experience, on the other hand, has shown that even such an acceptable redwood sign blank has to undergo a very labor intensive, involved process before the completed sign is ready to be installed.

1) Most clear, knot-free, vertical-grain redwood from the inner part of the tree is available only as 1" to 2" by 11" planks—whose edges have to be trimmed, routed to accept wooden splines to join two planks together, and the necessary number of planks then splined once again, glued and clamped overnight to provide sufficient area for the sign to be fabricated.

2) Then, the sign panel has to be cut to size with a circular saw, or cut to shape with a jigsaw, its face sanded with a belt sander to remove the joints between the planks and to level them, and then further sanded with an orbital sander to remove the scratches left by the belt sander.

3) A sealer is applied next to seal out any moisture and to seal in any sap that may cause discoloration in the paint finish. Once the sealer is dry, the panel is primed on front and back with a white pigmented primer to block out the color of the wood so as to provide a base for the subsequent coats of paint; which—once dry—the primer is then sanded smooth and a coat of enamel or other lettering color applied as a finish coat.

4) The lettering and graphics for the sign are then cut from a self-adhesive rubber masking material and applied to the face of the panel, the panel is then sandblasted by a large compressor employing a variety of blasting materials, and the painted surface surrounding the letters blasted away along with, usually, $\frac{1}{4}''$–$\frac{1}{2}''$ of the redwood panel.

5) The "blasted" area is then painted with the masking still in place—but if sprayed on, the paint has been noted to soak in and require several coats in order to provide adequate protection for the wood; if, as is normal, the paint is brushed on, unsightly deposits of paint often are left around the lettering and the masking needs to be removed while the background paint is still wet. Both these operations are quite messy.

Thus, the present practice of creating three-dimensional redwood signs painted with a background color and a lettering color will be seen to be quite labor intensive. As such, the signs are quite costly to manufacture and take many days to produce. As will also be recognized by those skilled in the art, the woodworking and painting processes tend to be tedious and time consuming— and require equipment, tools and materials to be stocked, as well as having to train skilled craftsmen to do the work. Even when performed perfectly well, moreover, the situation becomes all that more frustrating once the sign is installed, as where it is emplaced in a location where it is surrounded by landscaping and wetted down by sprinklers utilized in watering the shrubbery. In particular, experience has shown that a hot sun and a good soaking causes the glue joints of the redwood planks to delaminate, and the signs to split across their face. Obviously, not only does the workmanship then appear shoddy to the eyes of the client, but the situation requires an expenditure of time and money to repair.

OBJECTS OF THE INVENTION

It is an object of the present invention, therefore, to provide a redwood-sign substitute that can be sandblasted to provide an attractive appearance, impervious to weather, but which avoids the disadvantages associated with redwood sign manufacture.

It is another object of the invention to provide such a redwood-sign substitute which can be sandblasted in a manner to allow it to be installed in a much shorter period of time than associated with redwood sign manufacture.

It is an additional object of the invention to provide a redwood-sign substitute which can be sandblasted to provide a three-dimensional sign of two colors, and able to withstand outdoor weather conditions.

It is also an object of the invention to provide a redwood-sign substitute which could be sandblasted to allow for colored lettering on a textured, colored background.

SUMMARY OF THE INVENTION

As will become clear from the description that follows, such a redwood-sign substitute embodying the invention comprises a substrate composed of a plurality of overlying foam laminations of a first density spaced apart one from another by a plurality of separators of greater density, with the separators being of a narrower width than the overlying foam laminations, with the foam laminations being colored throughout, and with the substrate forming a panel for a sign. As will be seen, in such embodiment, the separators are also colored throughout, and of a coloration substantially the same as the color of the overlying foam laminations. In accordance with the invention to be described, the substrate is formed with a flat facing surface and side edge surfaces, and includes colored signage information laid out horizontally across the facing surface, with the plurality of foam laminations and the plurality of separators being laid out vertically. To provide the two-color effect—and as will be made clear from the following description—, the signage information is of a color different from that of the plurality of foam laminations and of the plurality of separators—while the sandblasting to which the substrate is put operates far more readily on the overlying foam lamination than on their individual separators—especially where the separators are composed of a plasticized paper, and where the foam laminations are either of a urethane composition or of a polyvinylchloride composition. As will be appreciated by those skilled in the art, such characteristics lead to a three-dimensional woodgrain pattern which can be replicated from one sign to another, and wherein the "grain" and "hardness" are predictable—as contradistinct from that with presently available cut redwood as employed in the sign industry.

BRIEF DESCRIPTION OF THE DRAWINGS

These and other features of the present invention will be more clearly understood from a consideration of the following description, taken in connection with the accompanying drawing, in which.

DETAILED DESCRIPTION OF THE DRAWING

Figure 1:
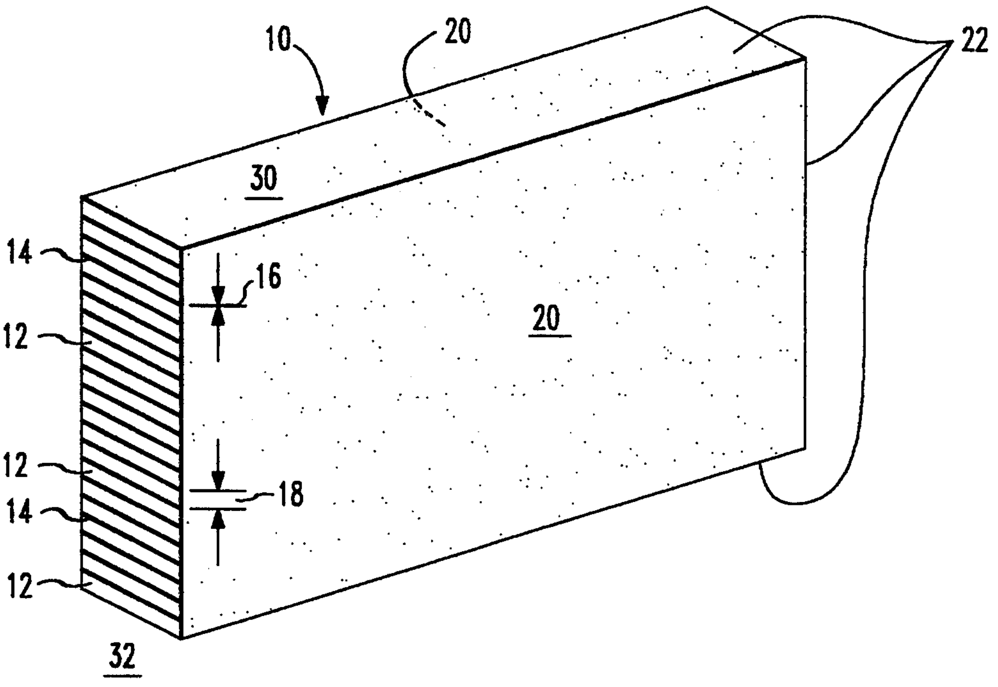
FIG. 1 is a perspective front view of the substrate of the invention as it might appear prior to sandblasting.
Figure 2:
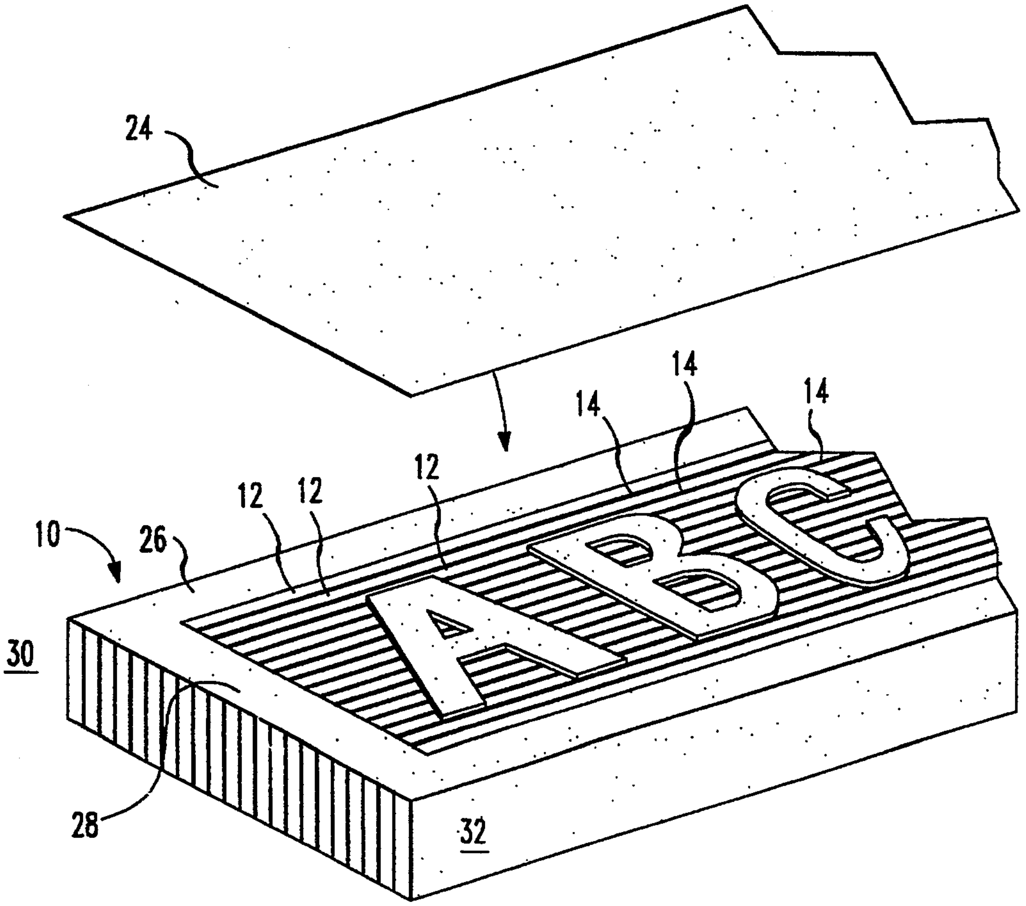
FIG. 2 is an illustration of the effects a sandblasting operation might have in forming colored lettering on a three-dimensional sign utilizing the teachings of the invention.

In FIGS. 1 and 2, the redwood-sign substitute incorporates a substrate 10 composed of a plurality of overlying foam laminations 12 of a first density. Such synthetic may be fabricated of a urethane composition, a polyvinylchloride composition, a polystyrene composition, or any other foam that may be colored throughout—for example, so as to admit of a background which is "brown", "blue", etc.

Between the individual laminations 12—and spacing them one apart from another—are a plurality of separators 14 of a second, greater density than that of the foam laminations 12. In a preferred embodiment of the invention, a plasticized paper composition was found to work perfectly well in ultimately yielding a synthetic wood-sign substitute, with the separators 14 being of a narrower width 16 than the width 18 of the foam laminations 12.

As is also shown in FIGS. 1 and 2, the substrate 10 incorporates a flat facing surface 20 and side edge surfaces 22 adjacent thereto, which are typically to be of colors contrasting with that of the substrate, when provided with appropriate borders for the sign information—for example, "ivory" for a "brown" substrate, "yellow" for a "blue" substrate, etc.

According to the invention, any desired "signage information" that is intended to be present on the substrate 10 will eventually be laid down horizontally (i.e. from left-to-right) atop the facing surface 20 with the plurality of overlying foam laminations 12 and the plurality of separators 14 being laid out vertically (FIG. 2). In particular, in fabricating the redwood-sign substitute of the invention, a colored facing material or "surface layer" 24 is placed over the flat facing surface 20 and overlain with a masking material which is substantially cut entirely away except where the signage information is to appear—illustratively, the letters "A", "B", "C", the areas where the masking material continues to overly the colored facing material. Such colored facing material 24 will be appreciated to be the same contrasting color to the colored substrate 10 as may be utilized in forming the borders 26, 28 of the sign being fabricated (in which instance, where a border 26 is desired, a masking material is also there overlain atop the colored facing material).

As will then be appreciated by those skilled in the "sandblasting-sign" art, an appropriate sandblasting operation (from top 30-to-bottom 32, or vice versa) cuts away the colored facing material, except in those areas where the masking material is applied which, once removed, then displays the sign information of the contrasting color, while exposing the underlying layers of laminations 12 along with their separators 14.

Testing has shown the end result to be a three-dimensional sign with a background color (substrate 10) and a letter color (facing material 24) of contrasting color. The side edge surfaces can be provided with a similar contrasting color at 28, if desired, to match that of the sign information in completing the arrangement. Analysis has also shown that the synthetic "woodgrain pattern" that results can be replicated from sign to sign simply by having the foam laminations 12 and the separators 14 of reproducible width 18, 16 so as to provide a uniformity and predictability—which is not present with the conventional redwood sign where grain and hardness varies from one plank to another. And, by standardizing the sign substrate in the manner described, available mounting systems could be developed, also standardized so as to simplify installation procedures as contrasted with the installation of redwood signs according to the prior art. As will be appreciated, this might involve a complete line of mounting brackets and installation hardware to be available for erecting. Additionally, the synthetic wood-sign substitute of the invention will be seen to be lighter in weight than its comparable redwood sign counterpart, and obviates the need for always stocking and keeping in inventory enough redwood planks to make a large, custom sign, even of dimension 4′×8′ when ordered. Because of the absence of any glue joints in laminating redwood planks together in making such a sized sign, any combination of hot sun and/or water soaking does not lead to sign delamination or splitting—as it becomes just an easy task to fabricate the substrate 10 to already be in the form of a 4′×8′ sign panel to start with.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. The combination comprising:

a substrate composed of a plurality of overlying foam laminations of a first density spaced apart one from another by a plurality of separators of a second density, with said separators being of a greater density than that of said overlying foam laminations, with said separators being of a narrower width than said overlying foam laminations, with said foam laminations being colored throughout, and with said substrate forming a panel for a sign, with said substrate having a flat facing surface and side edge surfaces forming a panel for said sign, and also including a colored signage information laid out horizontally atop said facing surface, with said plurality of overlying foam laminations and said plurality of separators being laid out vertically.

2. The combination of claim 1, wherein said plurality of separators are also colored throughout.

3. The combination of claim 2, wherein said plurality of separators and plurality of overlying foam laminations are substantially of the same color throughout.

4. The combination of claim 3, wherein said signage information is of a color different from that of said plurality of overlying foam laminations and said plurality of separators.

5. The combination of claim 4, also including a colored border on said facing surface adjacent to said side edge surfaces.

6. The combination of claim 5, wherein said colored border is of the same color as said signage information.

7. The combination of claim 6, wherein said side edge surfaces of said substrate are of the same color as said signage information.

8. The combination of claim 4, wherein said plurality of overlying foam laminations are of a urethane composition.

9. The combination of claim 4, wherein said signage information is of a polyvinylchloride composition.

10. The combination of claim 4, wherein said plurality of separators are of a plasticized composition.

11. The combination of claim 1, wherein said signage information is composed of a colored facing material overlain with a masking material, and in which substantially all said masking material is cut-away except where said signage information is to appear on said panel.

* * * * *